(12) United States Patent
Okamoto et al.

(10) Patent No.: US 8,188,795 B2
(45) Date of Patent: May 29, 2012

(54) PHASE COMPARATOR AND REPRODUCTION SIGNAL PROCESSOR USING THE SAME

(75) Inventors: Kouji Okamoto, Osaka (JP); Kouhei Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 640 days.

(21) Appl. No.: 12/439,966

(22) PCT Filed: Jul. 8, 2008

(86) PCT No.: PCT/JP2008/001824
§ 371 (c)(1),
(2), (4) Date: Mar. 4, 2009

(87) PCT Pub. No.: WO2009/031260
PCT Pub. Date: Mar. 12, 2009

(65) Prior Publication Data
US 2009/0315878 A1    Dec. 24, 2009

(30) Foreign Application Priority Data
Sep. 3, 2007 (JP) ................. 2007-227815

(51) Int. Cl.
*H03L 7/00* (2006.01)
*G11B 5/09* (2006.01)

(52) U.S. Cl. ..... 331/25; 331/1 A; 369/59.22; 369/53.34; 360/51

(58) Field of Classification Search .................. 331/1 A; 369/59.22, 53.34; 360/51
See application file for complete search history.

(56) References Cited

U.S. PATENT DOCUMENTS

| | | | |
|---|---|---|---|
| 5,742,576 A | 4/1998 | Hayashi et al. | |
| 6,151,282 A | 11/2000 | Hamada et al. | |
| 6,445,662 B1 | 9/2002 | Tonami | |
| 6,542,039 B1 * | 4/2003 | Ogura | 331/11 |
| 6,934,229 B2 | 8/2005 | Fujiwara | |
| 7,423,948 B2 | 9/2008 | Kawabe et al. | |
| 2002/0181360 A1 | 12/2002 | Hamada et al. | |
| 2006/0044990 A1 | 3/2006 | Kawabe et al. | |

FOREIGN PATENT DOCUMENTS

| | | |
|---|---|---|
| CN | 1784743 A | 6/2006 |
| JP | 2002-008315 | 1/2002 |
| JP | 3889027 | 12/2006 |

OTHER PUBLICATIONS

Chinese Office Action issued in Chinese Patent Application No. CN 200880000903.2 dated Sep. 8, 2010.

* cited by examiner

*Primary Examiner* — Arnold Kinkead
(74) *Attorney, Agent, or Firm* — McDermott Will & Emery LLP

(57) ABSTRACT

In a synchronous reproduction signal processor, when a phase error between reproduction data and a clock is repeatedly detected such that a clock synchronized with a reproduction signal is generated based on the phase error, a filtering process unit (34) performs a filtering process which performs a weighed addition with respect to a phase error series prior to the current time from a phase error calculation unit (33) using, e.g., a FIR filter with a plurality of taps so as to generate a reference value under reduced influence of noise mixed in the phase error series by feedback correction. A cross detection unit (32) detects the timing with which the sampled reproduction data crosses the reference value generated by the filtering process unit (34). This allows effective use of the dynamic range of the feedbacked reference value without limiting it, and simultaneously achieves the enhancement of noise immunity.

14 Claims, 22 Drawing Sheets

US 8,188,795 B2

PHASE COMPARATOR AND REPRODUCTION SIGNAL PROCESSOR USING THE SAME

RELATED APPLICATIONS

This application is the U.S. National Phase under 35 U.S.C. §371 of International Application No. PCT/JP2008/001824, filed on Jul. 8, 2008, which in turn claims the benefit of Japanese Application No. 2007-227815, filed on Sep. 3, 2007, the disclosures of which Applications are incorporated by reference herein.

TECHNICAL FIELD

The present invention relates to a phase comparator in a clock generation circuit which generates a clock synchronized with an inputted reproduction signal, and to a reproduction signal processor using the same.

BACKGROUND ART

To extract a clock synchronized with recorded data in a typical conventional reproduction signal processor, the oscillation frequency of a VCO (Voltage Control Oscillator) is controlled in, e.g., Patent Document 1 by quantizing an inputted reproduction signal with a quantization means (A/D converter), calculating a frequency error and a phase error with a digital circuit based on reproduction data obtained by removing an offset component from quantization data with an offset adjustment circuit, smoothing the frequency error and the phase error with a loop filter, and converting an amount of digital correction to an analog value with a D/A converter. FIG. 2 shows a block structure of such a feedback clock generation circuit. By performing feedback-type control as described above, synchronization between a clock for driving the A/D converter as well as a digital portion and a reproduction signal is intended. For the decoding of data, synchronization can be provided between the clock and the quantized reproduction data. This allows data detection to be performed by a data detector based on the data.

In the field of, e.g., an optical disc, higher densities have been achieved with a CD, a DVD, and the like. Further, a higher reproduction speed has also been achieved. In a synchronous clock generation circuit in which a digital arithmetic operation is included in a feedback loop, such as a reproduction signal processor shown in FIG. 2, a pipeline process needs to be performed in order to implement a high-speed operation so that clock digital latency in a feedback loop for clock extraction increases. In a typical conventional phase comparator as shown in FIG. 19, a phase error is calculated using data when a reproduction signal zero-crosses so that the linear range of the phase comparator is from $-\pi$ to $+\pi$. As a result, when the reproduction signal falls outside the linear range, phase inversion occurs. When the clock latency increases, the phase inversion frequently occurs to particularly significantly degrade the capture range (pull-in range) of the clock generation circuit, which is shown in FIG. 20.

On the other hand, in Patent Document 2, a phase detector is provided with the structure shown FIG. 21. The phase comparator of FIG. 21 has a structure different from a typical conventional structure, and generates a reference value by multiplying a previous phase error by a gain without fixing a timing of calculating a phase error to a zero-cross timing, and calculates a phase error with the timing with which inputted sampling data crosses the reference value. By providing the phase comparator with such a structure, it is possible to enlarge the linear range of the phase comparator and lessen the inversion level of phase inversion. This allows a significant improvement in pull-in characteristic. FIG. 22 shows the characteristics of the phase comparator shown in FIG. 21.

Patent Document 1: Japanese Laid-Open Patent Publication No. 2002-8315
Patent Document 2: Specification of Japanese Patent No. 3889027

DISCLOSURE OF THE INVENTION

Problem to be Solved by the Invention

In the foregoing structure described in Patent Document 2, it can be expected that the range of the reference value can be maximally used by setting the feedback gain to 1, and a significant improvement is obtained.

However, when the phase comparator of Patent Document 2 is applied to a reproduction signal processor capable of high-density recording in a Blu-ray disc system or the like, it is assumed that the S/N ratio of a reproduction signal deteriorates compared with that of a reproduction signal from a CD or DVD, noise immunity is low with the feed back gain invariably set to 1, and the reference value diverges due to the simultaneous use of gain control and offset control, which results in a deadlock state. The process resulting in the deadlock state is shown in FIG. 23. When the feedback gain is conversely set to a value less than 1, the deadlock state can be circumvented, but the variable range of the reference value is limited. This prohibits maximum use of the dynamic range achieved by feedback control.

An object of the present invention is to allow, when a timing of calculating a phase error is set to a timing of crossing a reference value, and the reference value is feedback-corrected in a phase comparator in a clock generation circuit, effective use of the dynamic range of the feedbacked reference value without limiting it, and also simultaneously achieve enhancement of noise immunity.

Means for Solving the Problem

To attain the object mentioned above, the present invention performs a filtering process with respect to a phase error series prior to the current time to generate a reference value.

Specifically, a phase comparator of the present invention is a phase comparator used in a clock generation circuit which extracts a synchronized clock which is synchronized with an inputted reproduction signal based on reproduction data obtained by sampling the reproduction signal with a sampling means, the phase comparator including: a cross detection unit which receives the reproduction data obtained with the sampling means and a predetermined reference value, and detects a cross timing with which the reproduction data crosses the reference value; a polarity determination unit which receives the reproduction data, and determines a polarity of an edge of the reproduction data; a phase error calculation unit which receives the reproduction data, a cross timing signal outputted from the cross detection unit, and a determination result from the polarity determination unit, and calculates a difference between the reproduction data and a zero value at the cross timing as a phase error; and a filtering process unit which filters the phase error calculated by the phase error calculation unit with the timing detected by the cross detection unit to generate the reference value to be given to the cross detection unit.

In the phase comparator of the present invention, the filtering process unit is a FIR filter.

In the phase comparator of the present invention, the filtering process unit is an IIR filter.

In the phase comparator of the present invention, the filtering process unit detects an envelope of the inputted phase error, and outputs the detected envelope.

In the phase comparator of the present invention, the filtering process unit determines that a signal quality of the reproduction data is low based on an interval between polarity changes in the reproduction data when the interval between the polarity changes is short, and mask-processes the corresponding phase error so as not to reflect the phase error in the filtering process unit.

In the phase comparator of the present invention, the filtering process unit has a counter for counting a timing outputted from the cross detection unit, and resets the counter and the filtering process unit every time a count value of the counter reaches a predetermined number.

In the phase comparator of the present invention, the filtering process unit has a counter for counting an interval between timings outputted from the cross detection unit, and resets the counter and the filtering process unit every time a count value of the counter exceeds a predetermined number.

In the phase comparator of the present invention, the filtering process unit has a counter for counting a number of polarity changes in the reproduction data, and resets the counter and the filtering process unit every time a count value of the counter reaches a predetermined number.

In the phase comparator of the present invention, the filtering process unit has a first counter for counting a number of polarity changes in the reproduction data and a second counter for counting an interval between timings outputted from the cross detection unit, and resets the first counter, the second counter, and the filtering process unit every time a difference between a value of the first counter and a value of the second counter exceeds a predetermined number.

In the phase comparator of the present invention, the cross detection unit and the filtering process unit operate independently of each other in accordance with the polarity of the edge of the sampling data relative to the reference value.

A clock generation circuit of the present invention has the phase comparator mentioned above, and generates the synchronized clock which is synchronized with the reproduction signal based on the phase error calculated by the phase error calculation unit of the phase comparator.

An image display device of the present invention includes: an LSI having the clock generation circuit mentioned above, and a signal processing circuit which decodes a reception signal including sound data and image data based on the clock obtained in the clock generation circuit; and a display terminal which receives a decoded signal from the LSI, pronounce the decoded sound data, and displays the decoded image data.

In the phase comparator mentioned above of a reproduction signal processor of the present invention, the inputted reproduction signal is supplied through a communication path including a wireless communication path, an optical fiber, a coaxial cable, or an electric power line.

In the phase comparator mentioned above of a reproduction signal processor of the present invention, the inputted reproduction signal is supplied from an optical disc including a DVD disc, a CD disc, or a Blu-ray disc.

Thus, the present invention performs a filtering process with respect to a phase error series prior to the current time to generate a reference value in a phase comparator in a clock generation circuit, and generates a phase error with the timing with which an inputted reproduction signal crosses the reference value. This allows effective use of the dynamic range of the feedbacked reference value without limiting it, and also simultaneously allows enhancement of noise immunity.

Effect of the Invention

As described above, the present invention achieves the effect of allowing, in the phase comparator in the clock generation circuit, effective use of the dynamic range of the feedbacked reference value without limiting it, while enhancing noise immunity.

DESCRIPTION OF NUMERALS

1 A/D Converter (Sampling Means)
2 Offset Adjuster
3 Phase Comparator
4 Loop Filter
5 D/A converter
6 VCO
7 Data Detector
10 Clock Generation Circuit
31 Polarity Determination Unit
32 Cross Detection Unit
33 Phase Error Calculation Unit
34, 35 Filtering Process Units
311, 313, 322, 324, 331,
348, 356, 361, 362, 384 Registers
334, 341, 342, 343, 351,
352, 414, 415 Registers with Enable
312, 321, 353, 416 Subtractors
323, 347, 365, 391 Adders
325 Logic Operation Circuit
332, 363, 364 Selectors
333, 344, 345, 346, 354,
355, 388, 389, 390 Multipliers
366 Clip Circuit
371 Mask Signal Generation Unit
372 AND Operation Circuit
381 Edge Counter (Counter)
382, 393, 403, 419 Comparators
383, 404, 418 Predetermined Values
385, 386, 387 Enable Registers with Reset
392, 413 Edge Interval Counters (Counters)
394 OR Operation Circuit
401, 411 Polarity Change Detection Units
402 Counter
412 Change Interval Counter (First Counter)
413 Edge Interval Counter (Second Counter)
417 Absolute Value Calculation Circuit
101 Information Recording Unit
102 Information Reading Unit
103 LSI

BEST MODE FOR CARRYING OUT THE INVENTION

Hereinbelow, a detailed description will be given to the embodiments of the present invention with reference to the drawings.

Embodiment 1

Figure 1:
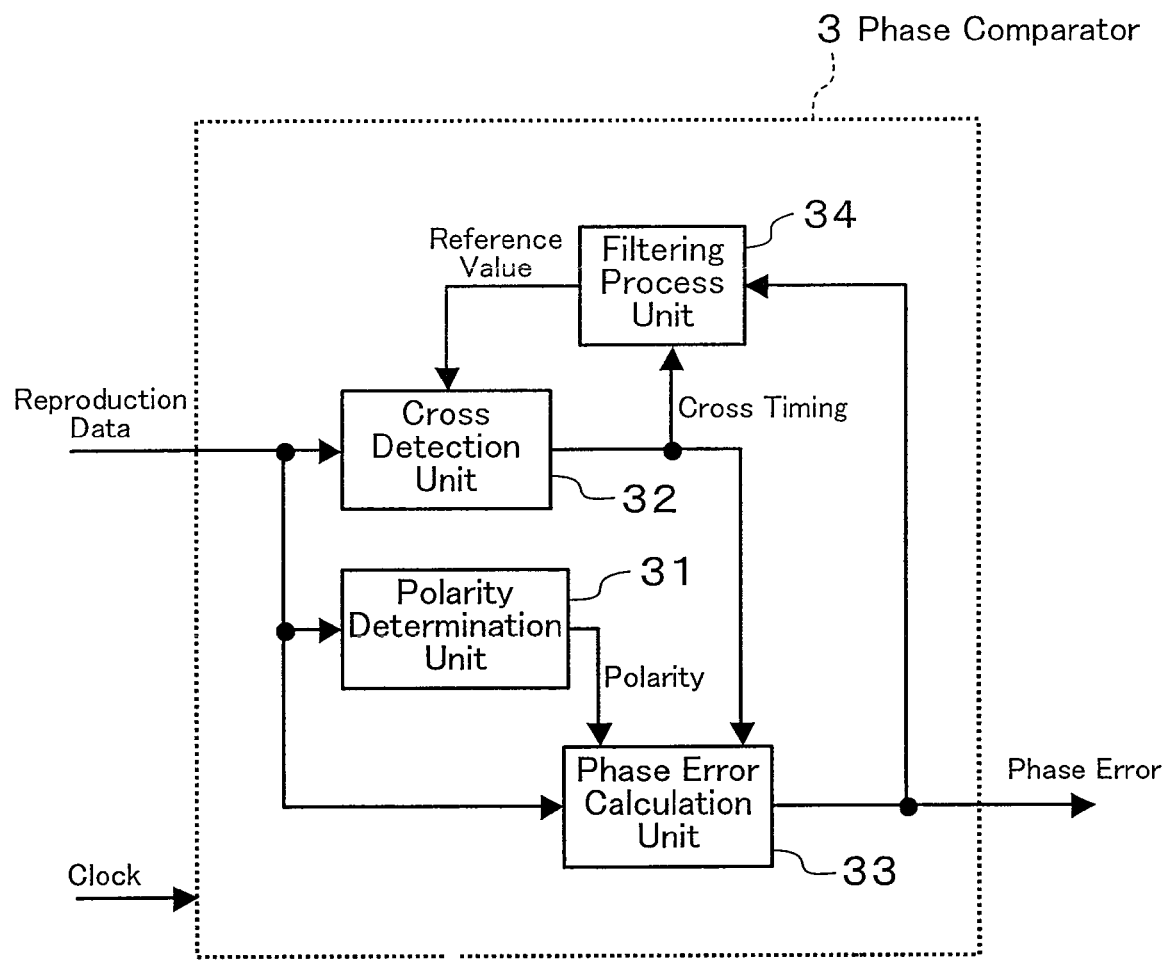
FIG. 1 is a block diagram of a phase comparator according to a first embodiment of the present invention.

FIG. 1 shows a structure of a phase comparator as the first embodiment of the present invention.

In a phase comparator 3 shown in FIG. 1, 31 is a polarity determination unit which determines the polarity of an edge of reproduction data, 32 is a cross detection unit which detects a timing with which the inputted reproduction data crosses a reference value, 33 is a phase error calculation unit which calculates a phase error by multiplying the difference between the inputted reproduction data and a zero value by the polarity outputted from the foregoing polarity determination unit 31 at the cross timing outputted from the cross detection unit 32, and 34 is a filtering process unit which performs a filtering process with respect to an inputted phase error series to generate the reference value.

Figure 2:
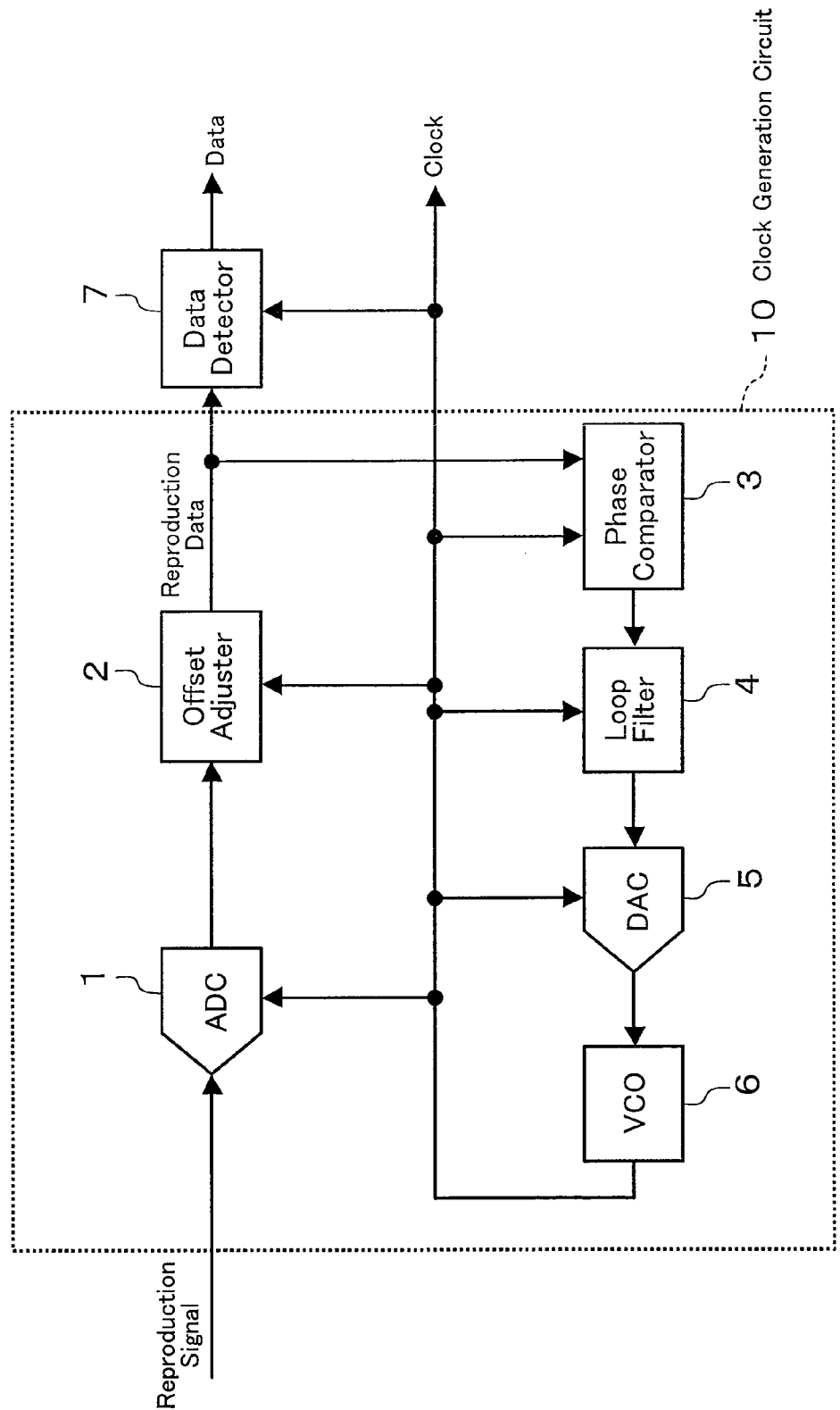
FIG. 2 is a block diagram of a reproduction signal processor including a clock generation circuit having the phase comparator.

FIG. 2 shows an example of a clock generation circuit and a reproduction signal processor which use the phase comparator 3. An inputted reproduction signal is quantized by an ADC (A/D converter (sampling means)) 1 to undergo offset control performed by an offset adjuster 2. The reproduction data that has undergone the offset adjustment is outputted to a data detector 7 where data extraction is performed. The reproduction data is also outputted to the phase comparator 3, where a phase error with a clock is calculated. The calculated phase error is outputted to a loop filter 4, and converted to an analog signal by a DAC 5 so that the oscillation frequency of a VCO 6 is performed. Finally, a clock generation circuit 10 controls a loop such that the inputted reproduction signal and the output clock of the VCO 6 are synchronized, and an output of the phase comparator 3 becomes zero.

A detailed description will be given hereinbelow to the structure and operation of the phase comparator 3 shown in FIG. 1. In the present embodiment, it is assumed that the inputted reproduction data is digital data represented by a 2's complement.

Figure 3:
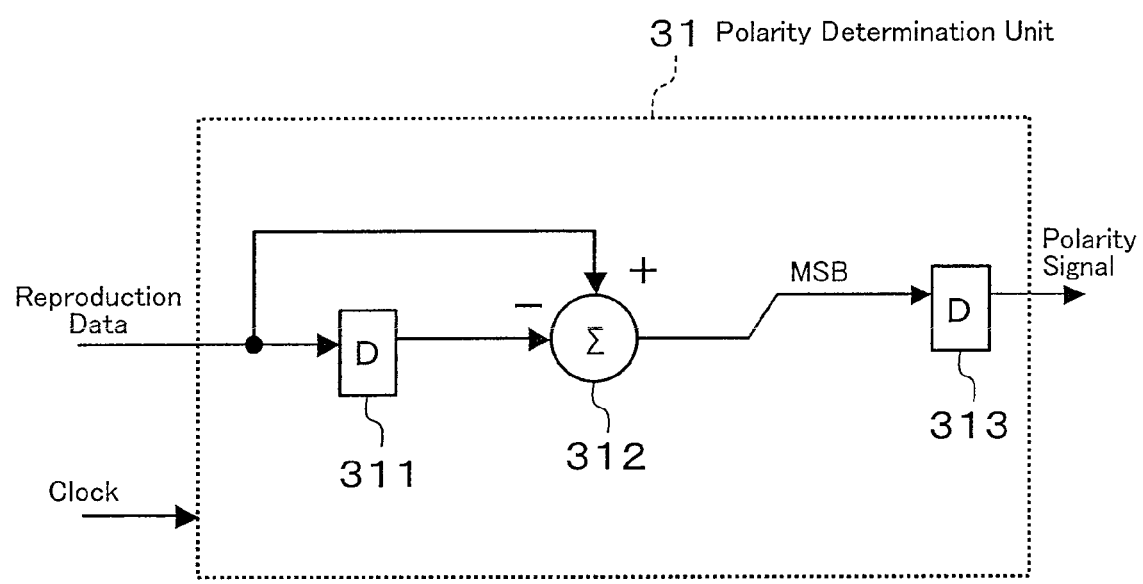
FIG. 3 is a view showing an example of an internal structure of a polarity determination unit provided in the phase comparator.
Figure 4:
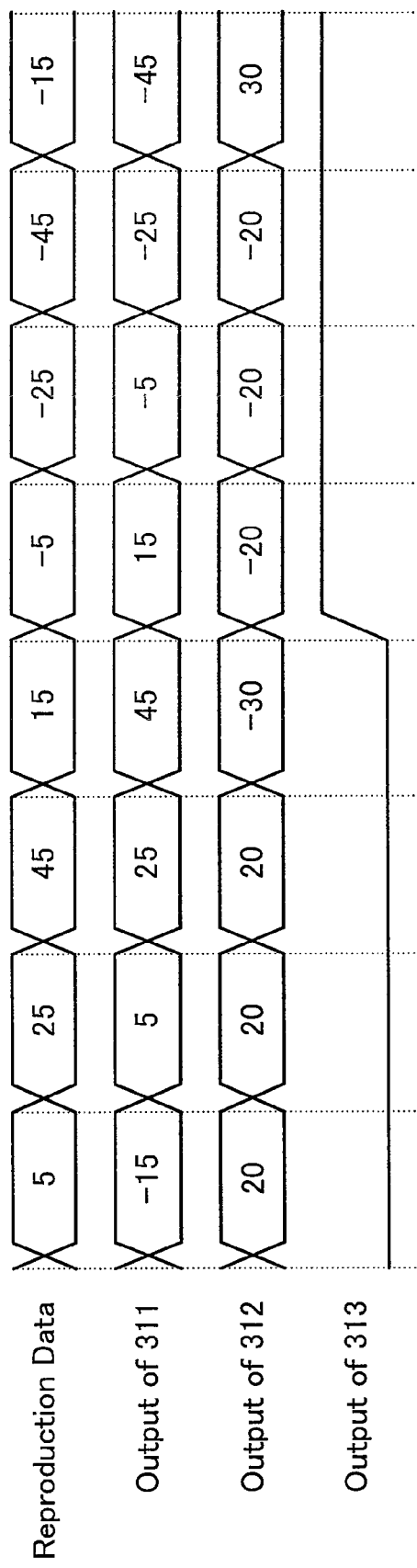
FIG. 4 is an operation timing chart of the polarity determination unit.

FIG. 3 shows an example of a structure of the polarity determination unit 31. 311 and 313 denote registers each driven by an inputted clock, and 312 denotes a subtractor. Because the register 311 fetches reproduction data with each clock edge, the subtractor 312 calculates the gradient of an inputted reproduction data series. Since the reproduction data is represented by a 2's complement in the present embodiment, the MSB of an output of the subtractor 312 indicates a sign bit. Therefore, an output of the register 313 becomes 0 when the gradient of the reproduction data is not less than 0, while it becomes 1 when the gradient of the reproduction data is negative. By performing the foregoing operation, the output of the polarity determination unit 31 becomes 0 when the reproduction data is in a rising state, while it conversely becomes 1 when the reproduction data is in a falling state. FIG. 4 shows a timing chart of the polarity determination unit 31 shown in FIG. 3.

Figure 5:
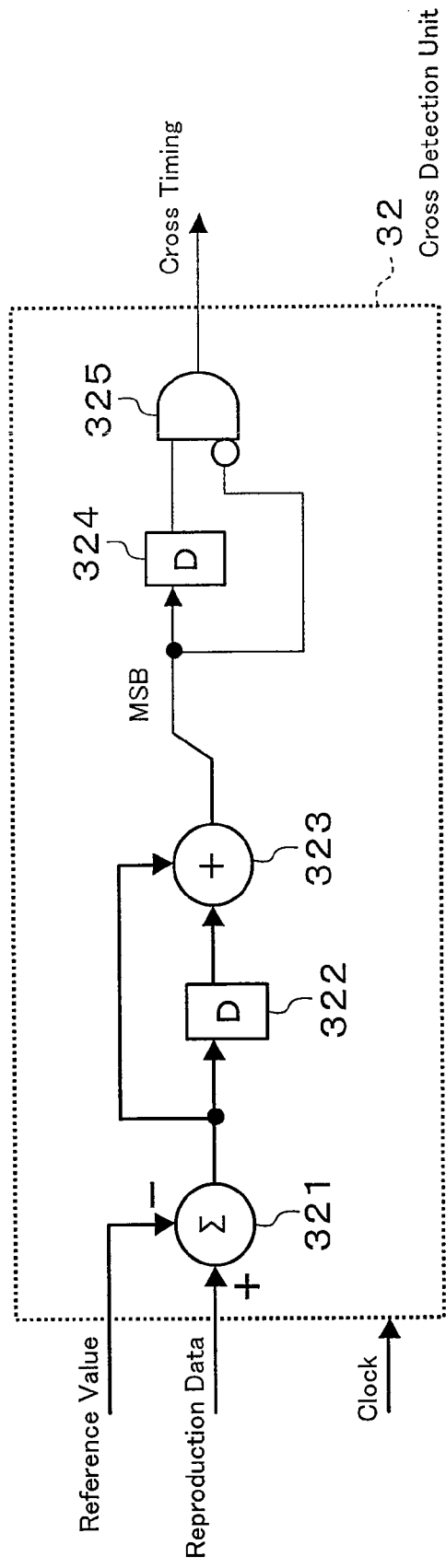
FIG. 5 is a view showing an example of an internal structure of a cross detection unit provided in the phase comparator.
Figure 6:
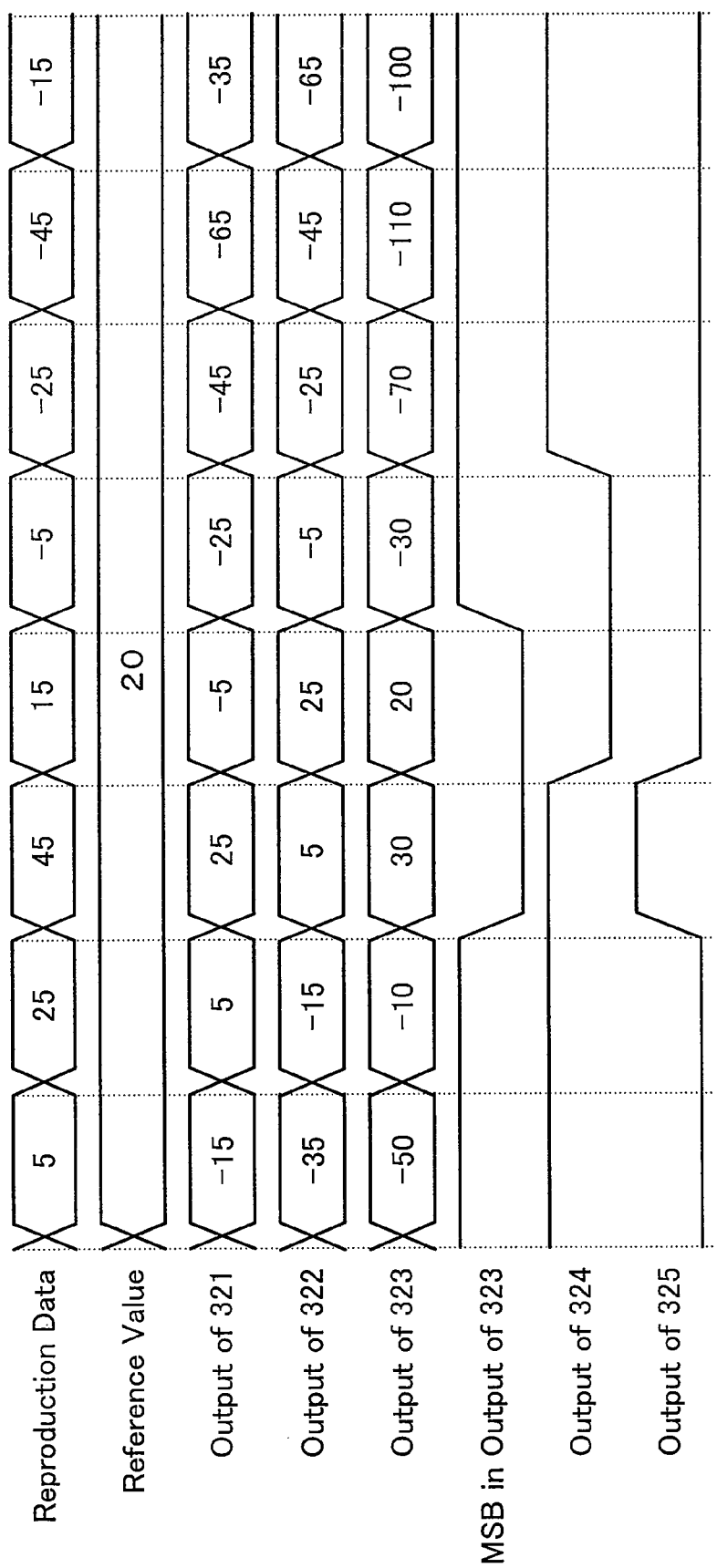
FIG. 6 is an operation timing chart of the cross detection unit.

FIG. 5 shows an example of a structure of the cross detection unit 32 in the phase comparator 3. In the drawing, 322 and 324 denote registers each driven by the inputted clock, 321 denotes a subtractor, 323 denotes an adder, and 325 denotes a logic operation circuit. The subtractor 321 performs a subtraction operation between the reproduction data and the reference value. Because the register 322 holds the result thereof, the adder 323 performs a (1+D) operation with respect to a data series obtained by subtracting the reference value from the reproduction data. Because the register 324 holds the MSB of the adder 323, an output of the logic operation circuit 325 becomes 1 with the timing with which an output of the adder 323 changes from a negative value to a positive value. That is, the cross detection unit 32 detects the timing with which the reproduction data crosses the reference value on a rising edge. FIG. 6 shows a timing chart of the cross detection unit 32 shown in FIG. 5. Although the structure detects the timing with which the reproduction data crosses the reference value on a rising edge, the structure may otherwise detect the timing with which the reproduction data crosses the reference value on a falling edge.

Figure 7:
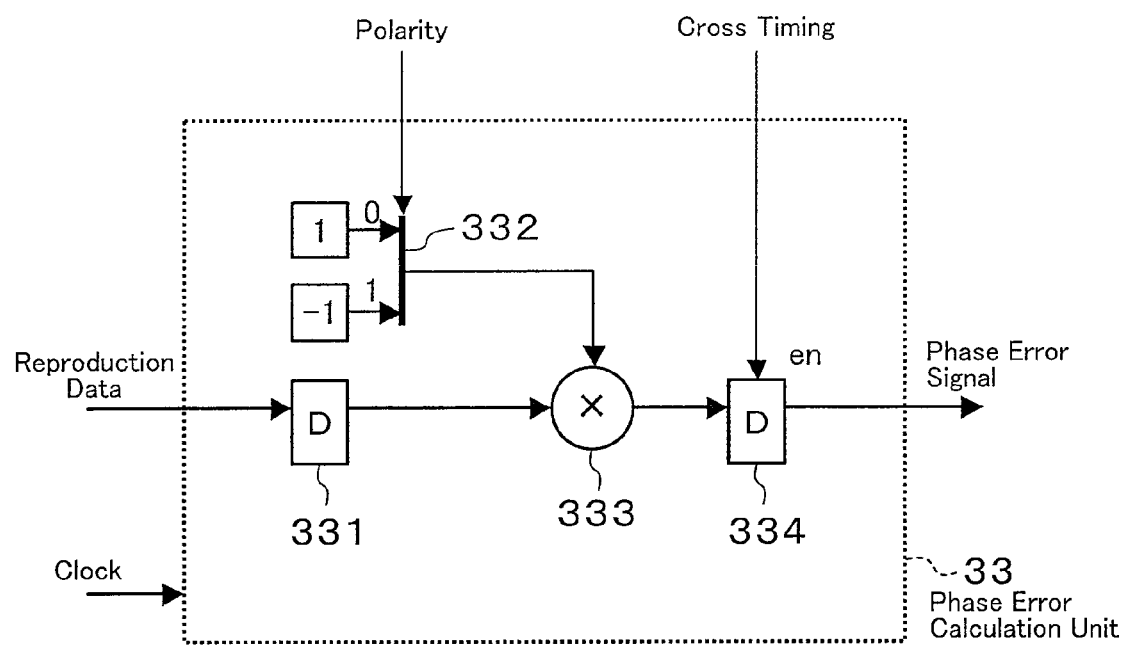
FIG. 7 is a view showing an example of an internal structure of a phase error calculation unit provided in the phase comparator.
Figure 8:
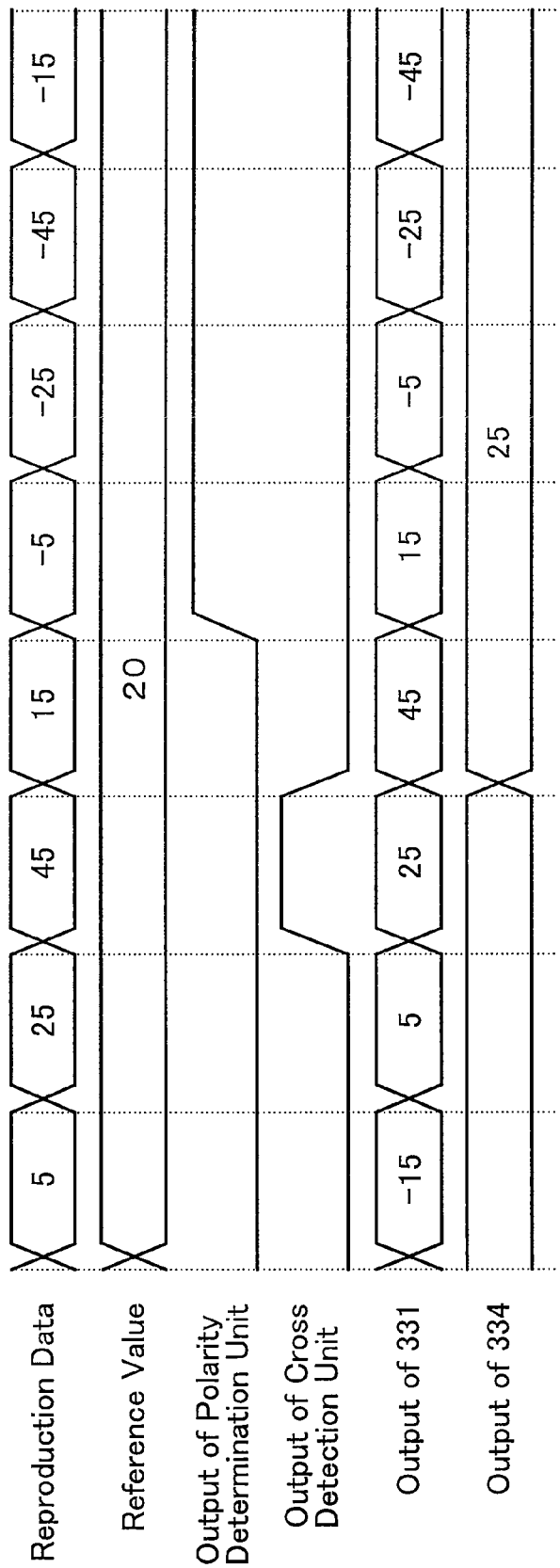
FIG. 8 is an operation timing chart of the phase error calculation unit.

FIG. 7 shows an example of a structure of the phase error calculation unit 33 in the phase comparator 3. In the drawing, 331 denotes a register driven by the inputted clock, 332 denotes a selector which outputs 1 when a polarity input is 0 (in a rising state), and outputs −1 when the polarity input is 1 (in a falling state), 333 denotes a multiplier, and 334 denotes a register which fetches an output of the multiplier 333 when the cross timing is 1 with the timing with which the clock is inputted. The register 331 performs delay adjustment for providing a match between a polarity signal and the cross timing, and updates the phase error by multiplying an output of the register 331 by a sign (an output of the selector 332) in accordance with a polarity when the cross timing is 1. FIG. 8 shows a timing chart of the phase error calculation unit 33 shown in FIG. 7. Although the cross detection unit 32 is provided with the structure which calculates the phase error with the timing which the reproduction data crosses the reference value on a rising edge in the present embodiment, the cross detection unit 32 may also be provided with a structure which calculates the phase error with the timing with which the reproduction data crosses the reference value on a falling edge.

Figure 9:
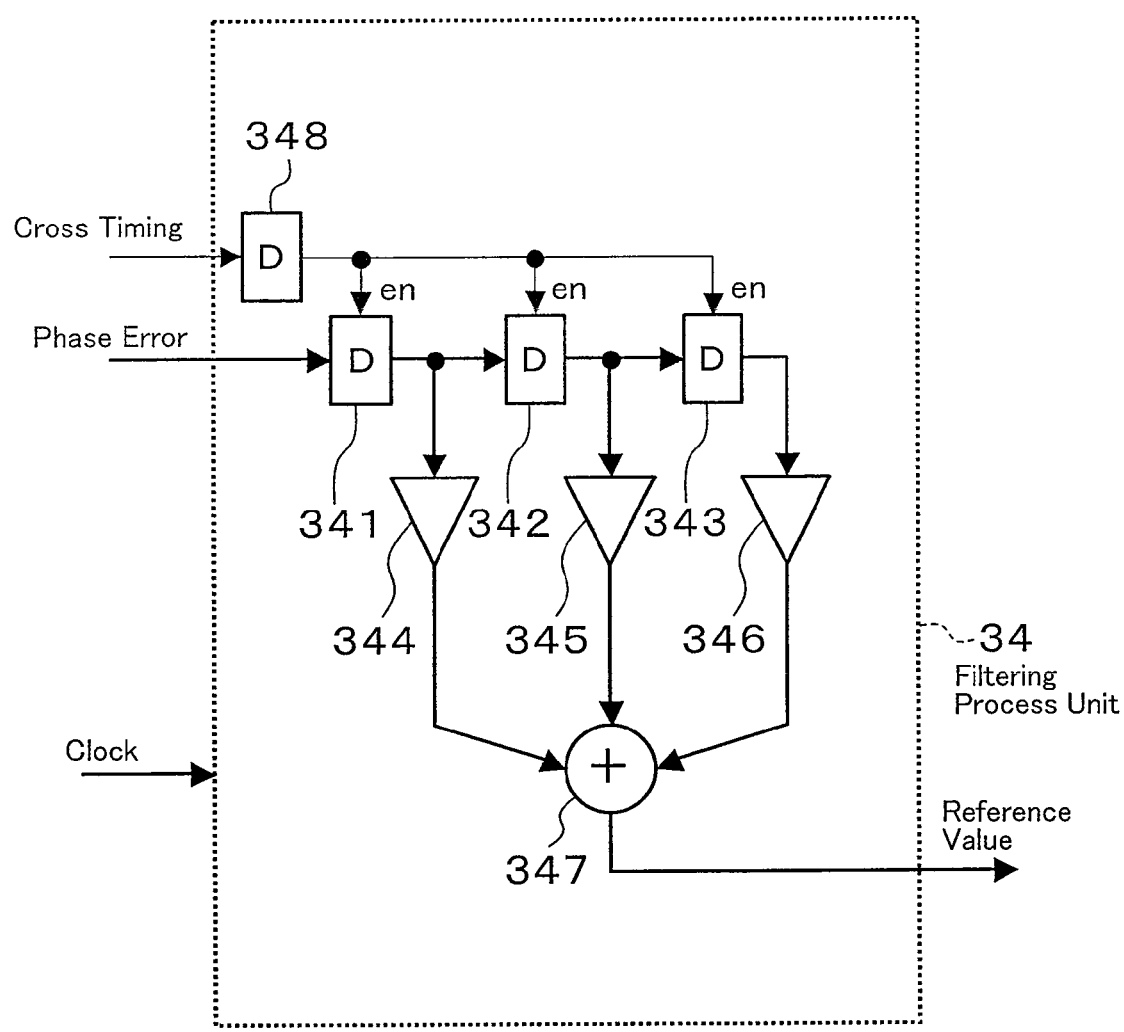
FIG. 9 is a view showing an example of an internal structure of a filtering process unit provided in the phase comparator.

FIG. 9 shows an example of a structure of the filtering process unit 34 in the phase comparator 3. In the drawing, 341, 342, and 343 denote registers which hold the phase error in response to the inputted clock when an output of a register 348 is 1, 344, 345, and 346 denote gain multipliers, 347 denotes an adder, and 348 denotes a register for timing adjustment which receives the cross timing. By thus providing the filtering process unit 34 with such a structure, it becomes possible to cause each of the registers 341, 342, and 343 to hold the phase error series every time the phase error is updated, and generate the reference value of the phase comparator 3 by performing an weighed addition with respect to the held error series using a 3-tap FIR filter, and thereby reduce the influence of noise mixed in the phase error series.

As described above, by performing a filtering process with respect to the phase error series prior to the current time in the phase comparator 3 in the clock generation circuit 10 to generate the reference value, and generating the phase error with the cross timing with which the inputted reproduction data crosses the reference value, it is possible to effectively use the dynamic range of the feedbacked reference value without limiting it, and simultaneously enhance noise immunity.

(Variation 1 of Filtering Process Unit)

Figure 10:
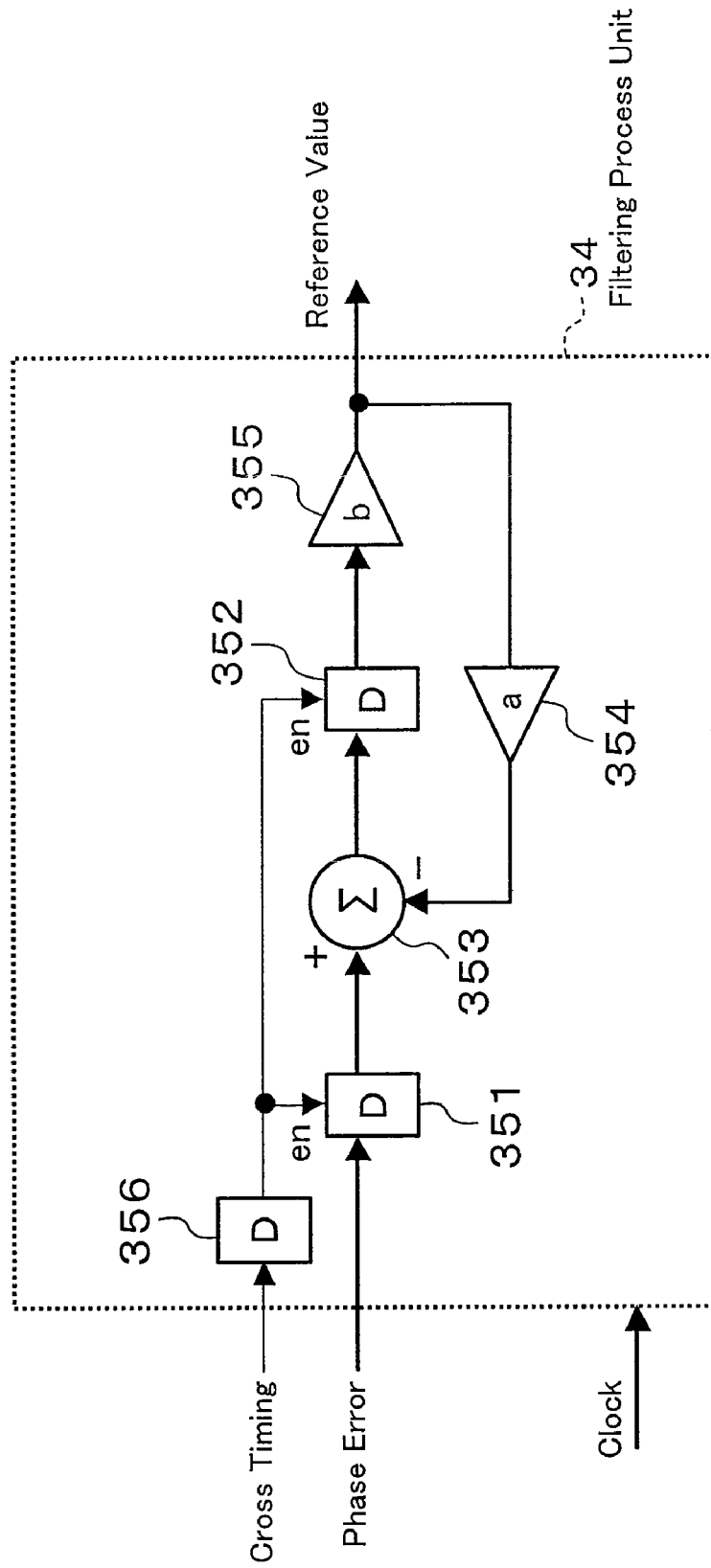
FIG. 10 is a view showing a first variation of the filtering process unit.

FIG. 10 shows a first variation of the filtering process unit 34 in FIG. 1 according to the first embodiment described above.

In the drawing, 351 and 352 denote registers each driven by an inputted clock which hold inputted data when an output of a register 356 is 1, 353 denotes a subtractor, and 354 and 355 denote gate multipliers. The 356 is a register which holds a cross timing, and is used for timing adjustment. The filter shown in FIG. 10 is a first-order IIR filter. By providing the filtering process unit 34 with such a structure, a filtering process is performed every time the phase error is updated, a high-frequency component can be removed from the gain characteristic of the filtering process unit 34 through proper setting of the values of the gain multipliers 354 and 355, and a noise component in the inputted phase error can be reduced.

Therefore, by performing a filtering process with respect to a phase error series prior to the current time to generate a reference value in the phase comparator 3 in the clock generation circuit 10, and generating a phase error with the timing with which inputted reproduction data crosses the reference value, it is possible to effectively use the dynamic range of the feedbacked reference value without limiting it, and simultaneously enhance noise immunity.

(Variation 2 of Filtering Process Unit)

Figure 11:
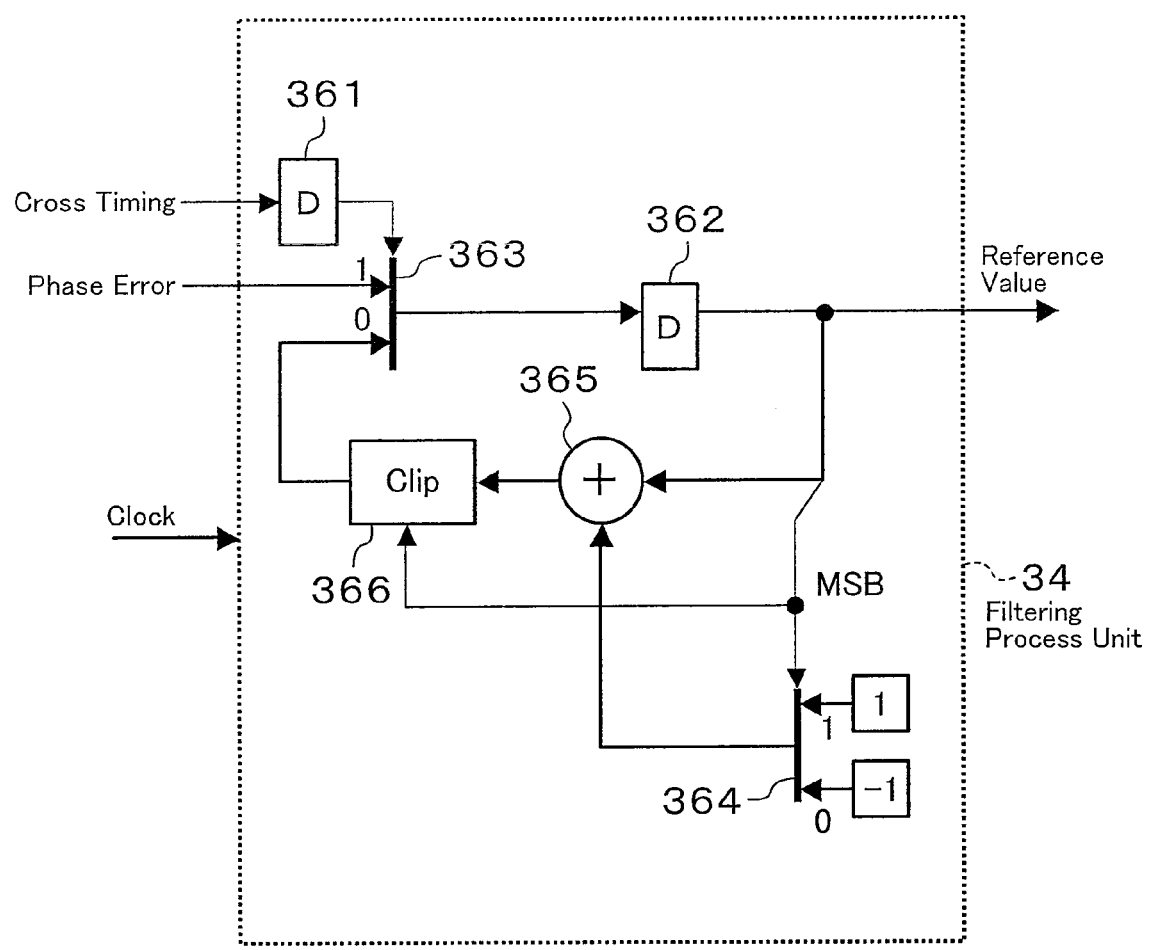
FIG. 11 is a view showing a second variation of the filtering process unit.

FIG. 11 shows a second variation of the filtering process unit 34 in FIG. 1 according to the first embodiment described above.

In the drawing, 361 and 362 denote registers each driven by an inputted clock, 363 and 364 denote selectors, 365 denotes an adder, and 366 denotes a clip circuit which clips an output of the adder 365 to 0 when the polarity thereof is different from that of the reference value. The resister 361 is used to adjust the timing of an inputted cross timing. When an output (a signal obtained by delaying the cross timing by one clock) of the register 361 is 1, the selector 363 outputs a phase error, and outputs the output of the clip circuit 366 when the output of the register 361 is not 1. To the register 362, an output of the selector 363 is inputted, and outputted therefrom as the reference value. The selector 364 outputs −1 when the polarity of the reference value is positive, and outputs +1 when the polarity of the reference value is negative. The adder 365 adds the output of the selector 364 to the reference value, and outputs the sum. The clip circuit 366 performs a zero clipping process with respect to the output of the adder 365 such that the polarity thereof remains the same, and does not change upon crossing zero. By providing the filtering process unit 364 with such a structure, it becomes possible to detect an envelope clipped to a zero value in the detected phase error series.

Therefore, by performing a filtering process based on envelope detection with respect to a phase error series prior to the current time to generate a reference value in the phase comparator 3 in the clock generation circuit 10, and generating a phase error with the timing with which inputted reproduction data crosses the reference value, it is possible to effectively use the dynamic range of the feedbacked reference value without limiting it, and simultaneously enhance noise immunity.

(Variation 3 of Filtering Process Unit)

Figure 12:
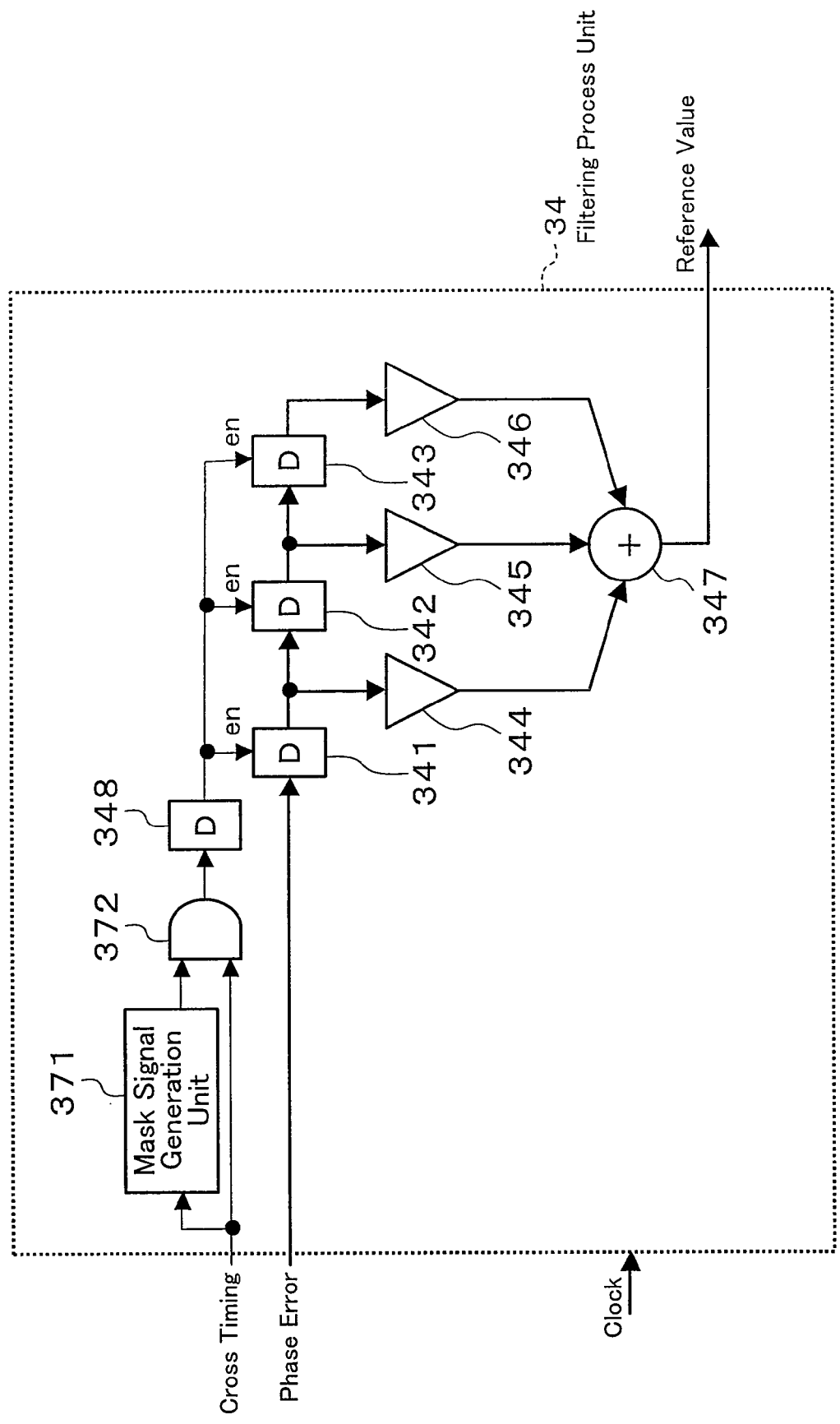
FIG. 12 is a view showing a third variation of the filtering process unit.

FIG. 12 shows a third variation of the filtering process unit 34 in FIG. 1 according to the first embodiment described above.

The structure shown in FIG. 12 is obtained by adding a mask signal generation unit 371 for masking a cross timing signal, and an AND operation circuit 372 to the structure of the filtering process unit 34 shown in FIG. 9. The mask signal generation unit 371 counts the interval between cross timings, and outputs an enable signal when the count value becomes not less than a predetermined value. The AND operation circuit 372 validates the update of a timing signal only when the enable signal is 1 with regard to the inputted cross timing, i.e., when the interval between the cross timings is not less than the predetermined value. This allows removal of an error factor resulting from a high frequency pattern with low reliability.

Therefore, by performing a filtering process with respect to a phase error series prior to the current time through the removal of information on the high frequency pattern with low reliability to generate a reference value in the phase comparator 3 in the clock generation circuit 10, and generating a phase error with the timing with which inputted reproduction data crosses the reference value, it is possible to effectively use the dynamic range of the feedbacked reference value without limiting it, and simultaneously enhance noise immunity.

(Variation 4 of Filtering Process Unit)

Figure 13:
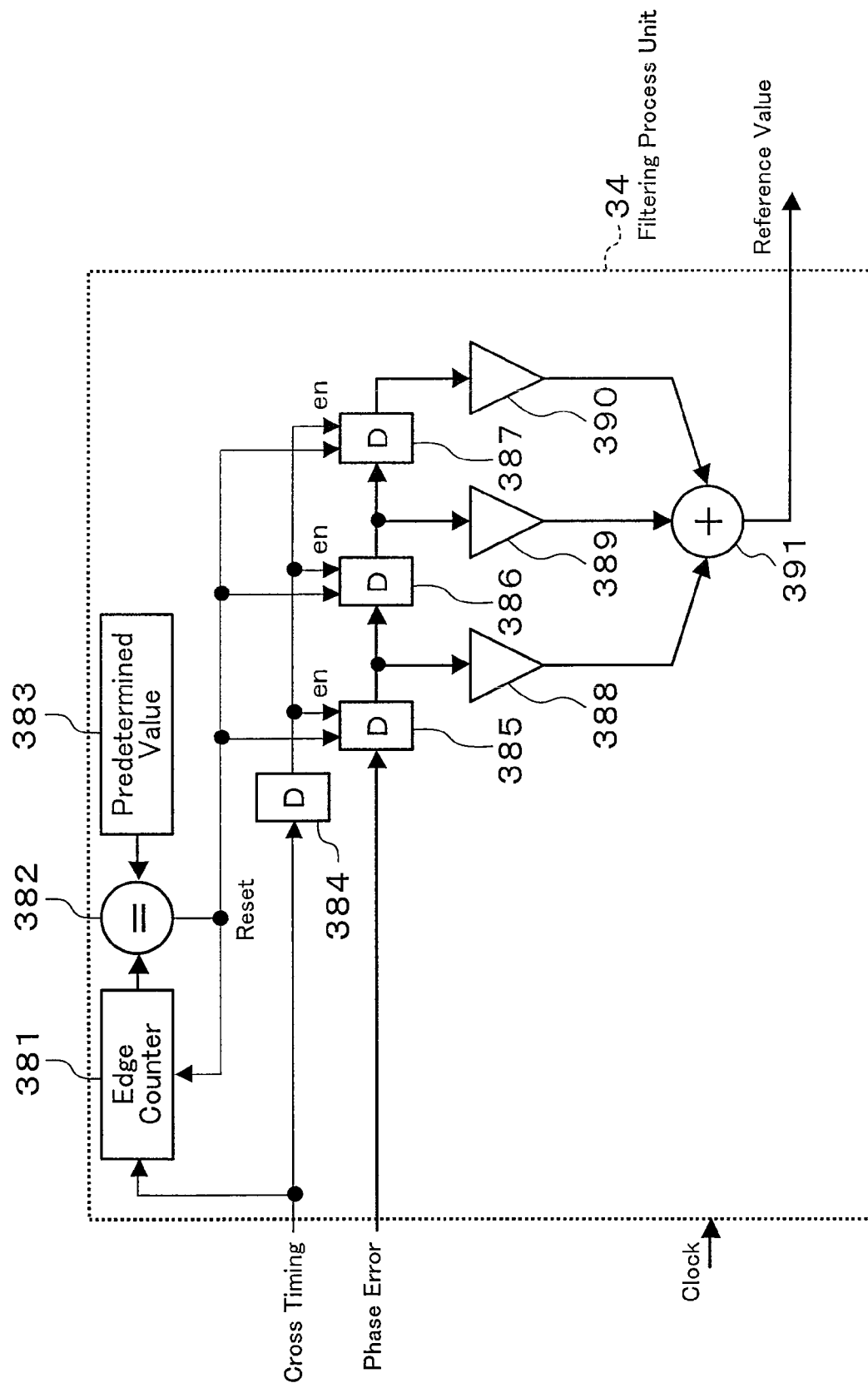
FIG. 13 is a view showing a fourth variation of the filtering process unit.

FIG. 13 shows a fourth variation of the filtering process unit 34 in FIG. 1 according to the first embodiment described above.

In the drawing, registers 385, 386, and 387 hold a phase error series which is inputted when a cross timing is 1. Based on the held phase error series, a reference value is generated. An edge counter (counter) 381 counts the number of edges of the cross timings. A comparator 382 compares the counter value with a predetermined value 383, and outputs a reset signal to each of the counter 381 and the registers 385, 386, and 387 when the counter value is equal to the predetermined value 383. When reset to 0, the edge counter 381 counts the number of edges of the cross timings again. In addition, the values of the registers 385, 386, and 387 are each reset to 0, and the reference value is also reset to 0.

Therefore, by performing a filtering process with respect to a phase error series prior to the current time to generate a reference value in the phase comparator 3 in the clock generation circuit 10, and generating a phase error with the timing with which the inputted reproduction data crosses the reference value, it is possible to effectively use the dynamic range of the feedbacked reference value without limiting it, and simultaneously enhance noise immunity.

Further, by forcibly setting the reference value to 0 every time a predetermined number of the cross timings are counted, the oscillation of the reference value can be suppressed.

(Variation 5 of Filtering Process Unit)

Figure 14:
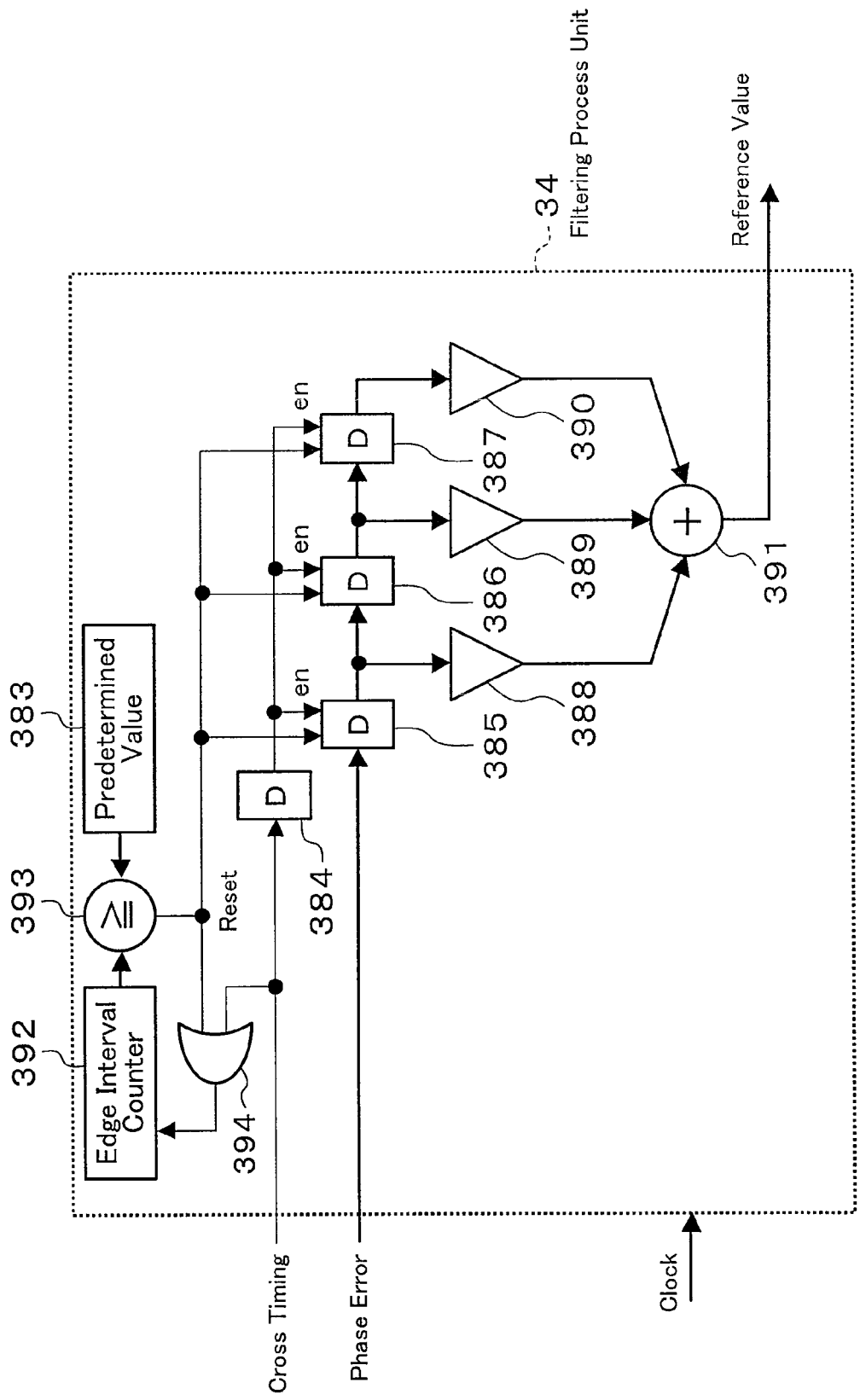
FIG. 14 is a view showing a fifth variation of the filtering process unit.

FIG. 14 shows a fifth variation of the filtering process unit 34 in FIG. 1 according to the first embodiment described above.

In the drawing, the registers 385, 386, and 387 hold a phase error series which is inputted when a cross timing is 1. A reference value is generated based on the held phase error series. An edge interval counter (counter) 392 counts the interval between the edges of the cross timings. A comparator 393 compares the counter value with the predetermined value 383, and outputs a reset signal to each of the edge interval counter 392 and the registers 385, 386, and 387 when an output of the edge interval counter 392 is not less than the predetermined value 383. When reset to 0, the edge interval counter 392 performs the operation of counting the interval between the edges of the cross timings again. In addition, the values of the registers 385, 386, and 387 are each reset to 0, and the reference value is also reset to 0. The edge interval counter 392 is also reset to 0 when the cross timing is 1.

Therefore, by performing a filtering process with respect to a phase error series prior to the current time to generate a reference value in the phase comparator 3 in the clock generation circuit 10, and generating a phase error with the timing with which inputted reproduction data crosses the reference value, it is possible to effectively use the dynamic range of the feedbacked reference value without limiting it, and simultaneously enhance noise immunity.

Further, by forcibly setting the reference value to 0 when the interval between the cross timings exceeds the predetermined value, the oscillation of the reference value can be suppressed.

Embodiment 2

Figure 15:
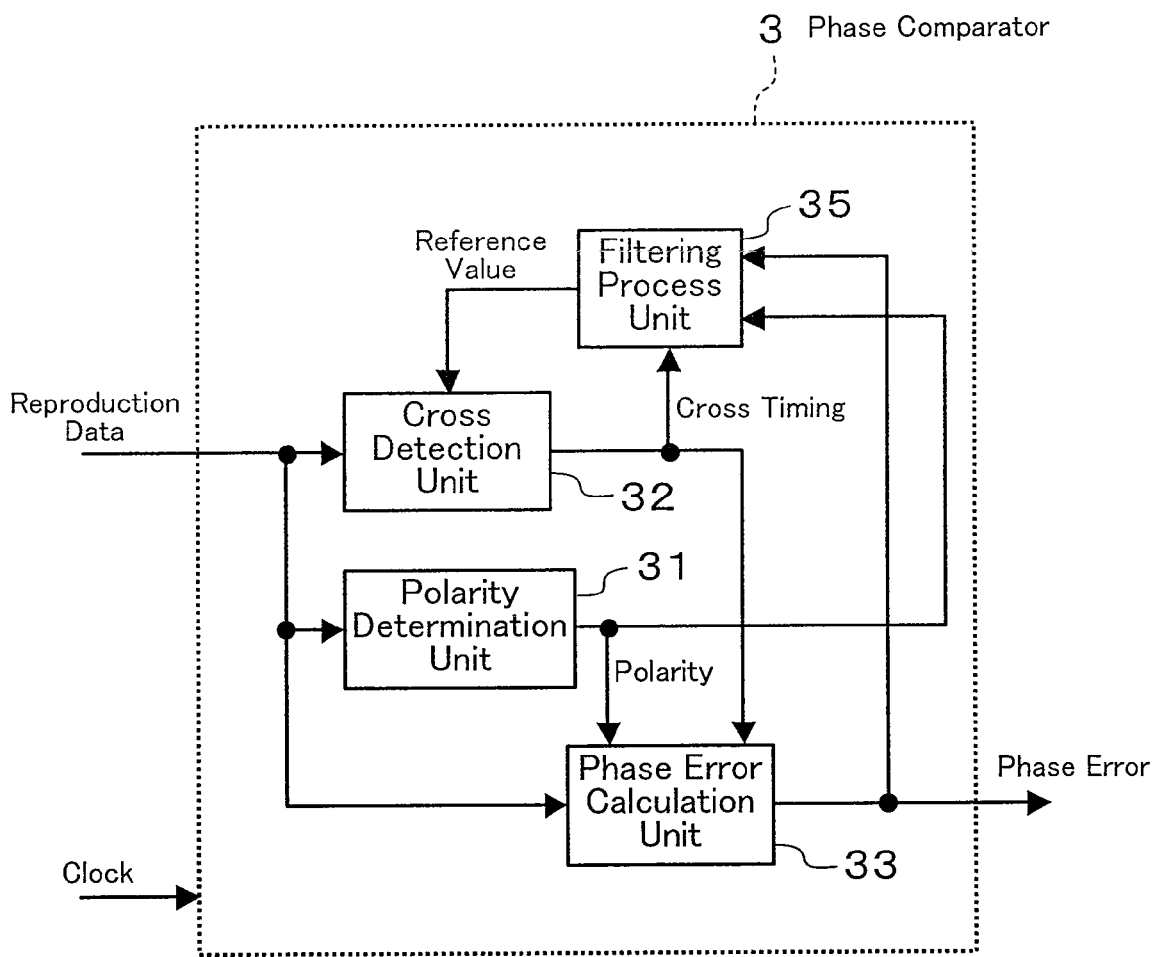
FIG. 15 is a block diagram of a phase comparator according to a second embodiment of the present invention.
Figure 16:
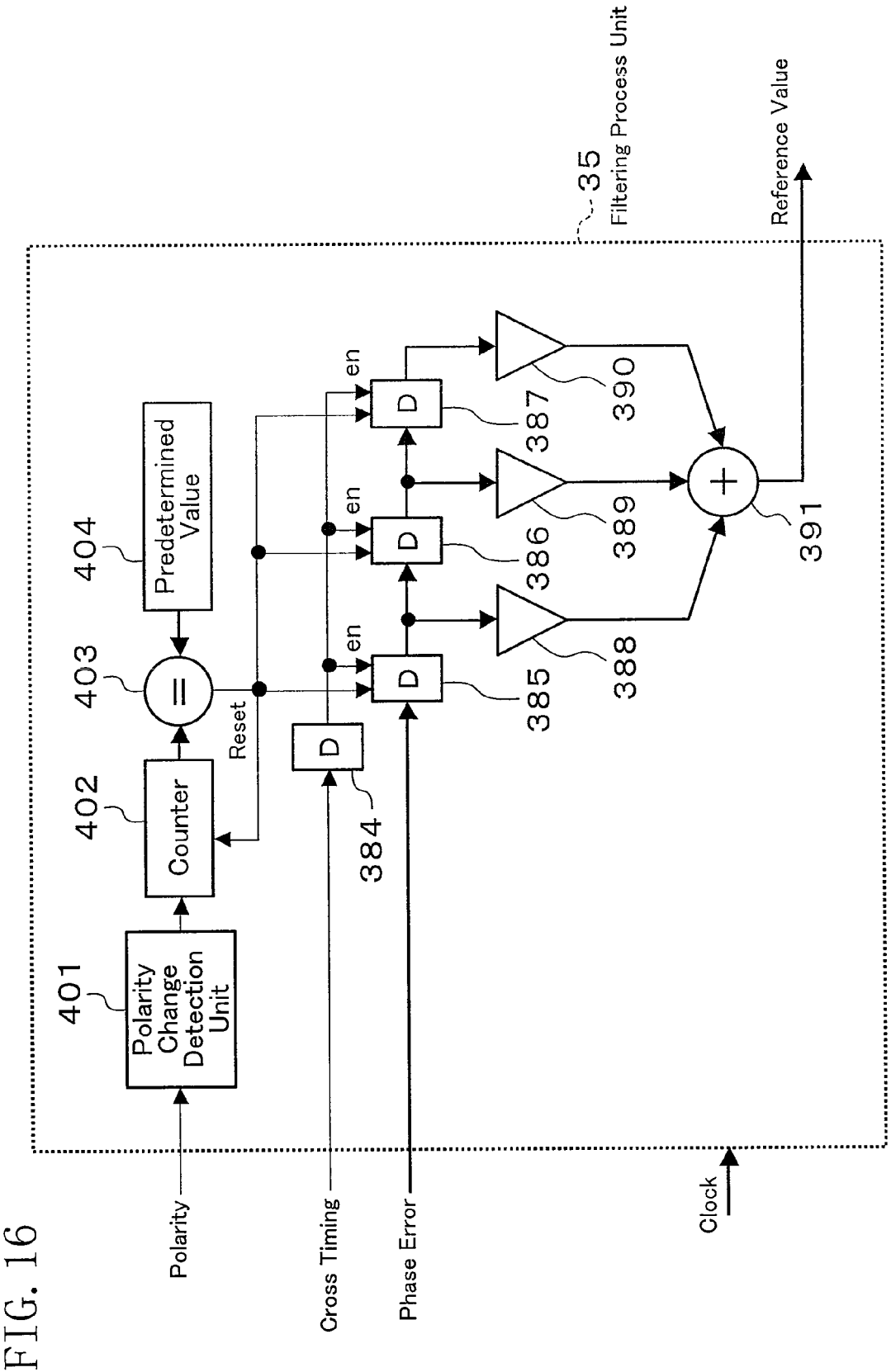
FIG. 16 is a view showing an example of an internal structure of a filtering process unit provided in the phase comparator.

FIG. 15 shows a structure of a phase comparator as the second embodiment of the present invention. FIG. 15 is different from FIG. 1 in that the output of the polarity determination unit 31 is also inputted to a filtering process unit 35. FIG. 16 shows an example of a structure of the filtering process unit 35 of FIG. 15. A basic block structure is the same as the structure of the filtering process unit 34 shown in FIG. 13. The specific difference therebetween is that, in the filtering process unit 35 shown in FIG. 16, a timing of resetting the reference value is generated with the number of changes in the polarity of inputted reproduction data. To implement this, a polarity change detection unit 401 detects a timing edge on which an inputted polarity changes from a positive polarity to a negative polarity, or from a negative polarity to a positive polarity. A counter 402 counts the number of timing edges detected by the polarity change detection unit 401. When the counter value becomes equal to a predetermined value 404, a comparator 403 generates a reset to the counter, and a reset signal for the reference value.

Therefore, by performing a filtering process with respect to a phase error series prior to the current time to generate a reference value in the phase comparator 3 in the clock generation circuit 10, and generating a phase error with the timing with which the inputted reproduction data crosses the reference value, it is possible to effectively use the dynamic range of the feedbacked reference value without limiting it, and simultaneously enhance noise immunity.

Further, by forcibly setting the reference value to 0 every time changes in the polarity of the inputted production data reaches the predetermined number, the oscillation of the reference value can be suppressed.

(Variation 1 of Filtering Process Unit)

Figure 17:
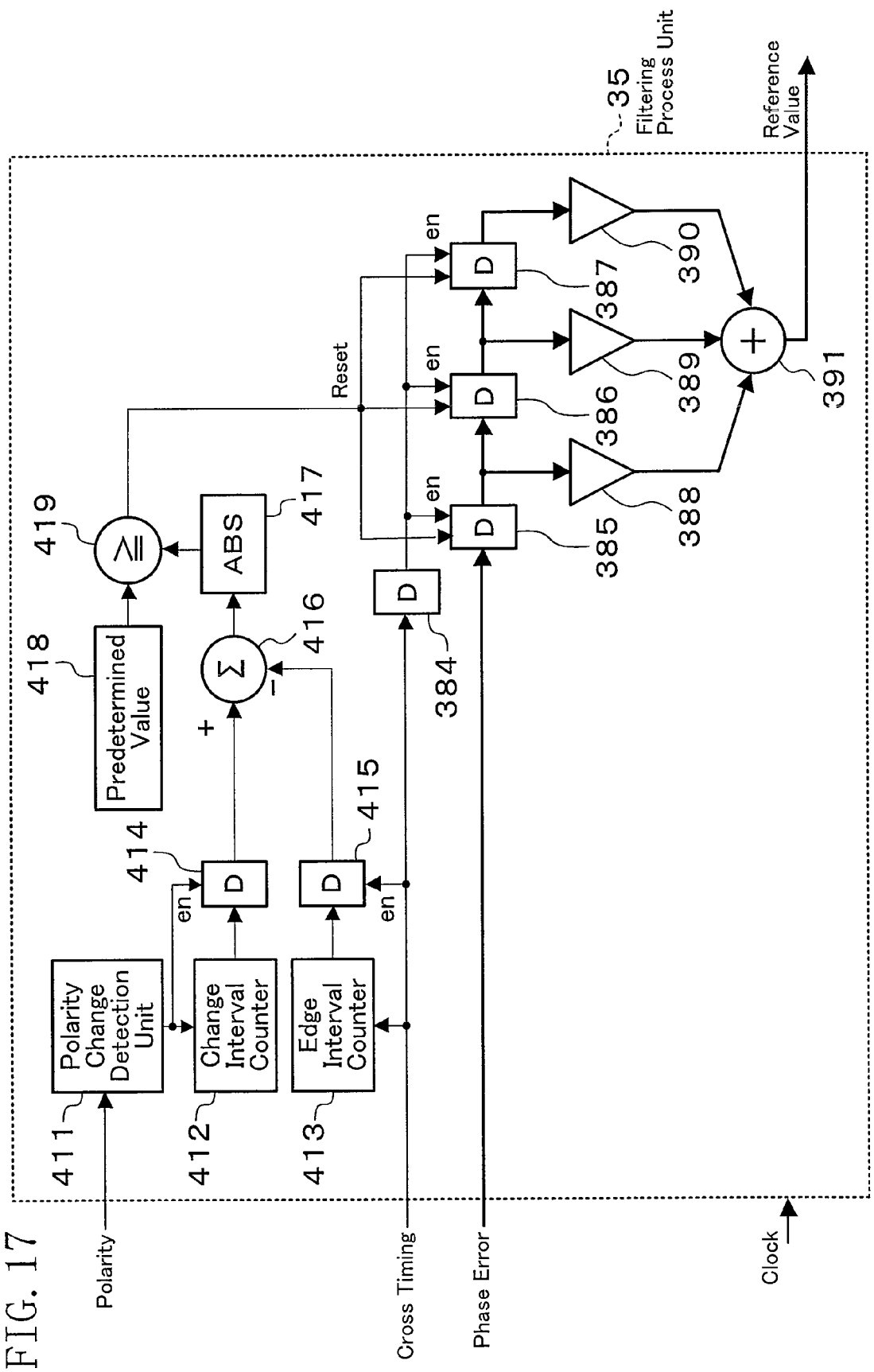
FIG. 17 is a view showing a variation of the filtering process unit.

FIG. 17 shows a first variation of the filtering process unit 35 in FIG. 1 according to the second embodiment described above. In the filtering process unit 35 shown in FIG. 17, when the difference between the interval between the inputted cross timings and the interval between polarity changes is not less than a predetermined value, it is determined that the reference value diverges, and the reference value is reset to 0. To implement this function, a polarity change detection unit 411 detects the timing with which reproduction data changes from a positive value to a negative value, or from a negative value to a positive value from inputted polarity information. A change interval counter (first counter) 412 counts the interval between polarity changes based on the change timing detected by the polarity change detection unit 411. This value is outputted to a register with enable 414 with the timing of a polarity change. On the other hand, an edge interval counter (second counter) 413 counts the interval between the edges of the cross timings. The count value is outputted to a register with enable 415 with the timing with which the cross timing is detected. A subtractor 416 performs a difference operation between the respective values held by the two registers with enable 414 and 415, and the result of the difference operation is converted to an absolute value by an absolute value calculation circuit 417. When an output of the absolute value calculation circuit 417 is not less than a predetermined value 418, it is judged that the reference value diverges, and a comparator 419 outputs a reset signal to each of the registers 385, 386, and 387 which store a phase error series to reset the reference value to 0.

Therefore, by performing a filtering process with respect to a phase error series prior to the current time to generate a reference value in the phase comparator 3 in the clock generation circuit 10, and generating a phase error with the timing with which the inputted reproduction data crosses the reference value, it is possible to effectively use the dynamic range of the feedbacked reference value without limiting it, and simultaneously enhance noise immunity.

Further, by forcibly setting the reference value to 0 when the difference between the interval between the polarity changes in the inputted reproduction data and the interval between the cross timings exceeds the predetermined value, the oscillation of the reference value can be suppressed.

In each of the first and second embodiments described above, the case is shown where the cross detector 32 calculates the phase error with the timing with which the reproduction data crosses the reference value on a rising edge. However, the same effect is obtainable even when the cross detector 32 is provided with a structure in which the phase error is calculated with the timing with which the reproduction data crosses the reference value on a falling edge. In that case, it is necessary to invert the polarity of the phase error inputted to each of the filtering process units 34 and 25 in consideration of the fact that the phase error is calculated with the timing with which the reproduction data crosses the reference value on the falling edge.

The same effect is also obtainable even when the cross detector 32 and the filtering process units 34 and 35 are provided to be capable of concurrently detecting both a rising edge and a falling edge on each of which the reproduction data crosses the reference value in parallel.

Figure 18:
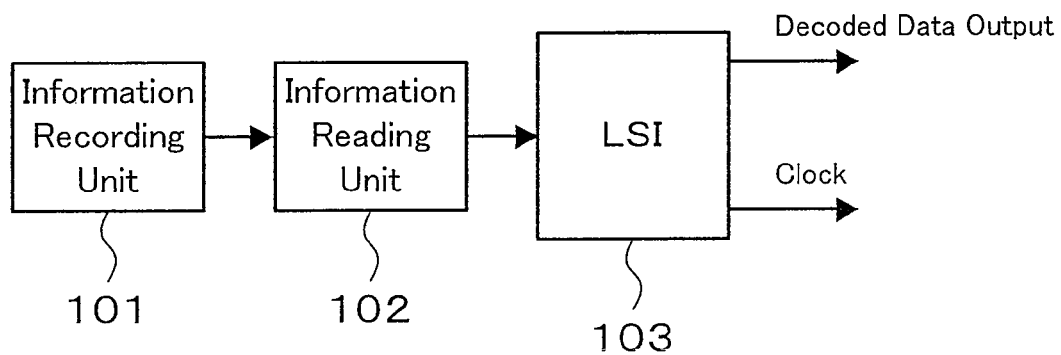
FIG. 18 is a view showing an example of a structure of a reproduction signal processor including an LSI having an embedded clock generation circuit including a phase comparator of the present invention.
Figure 19:
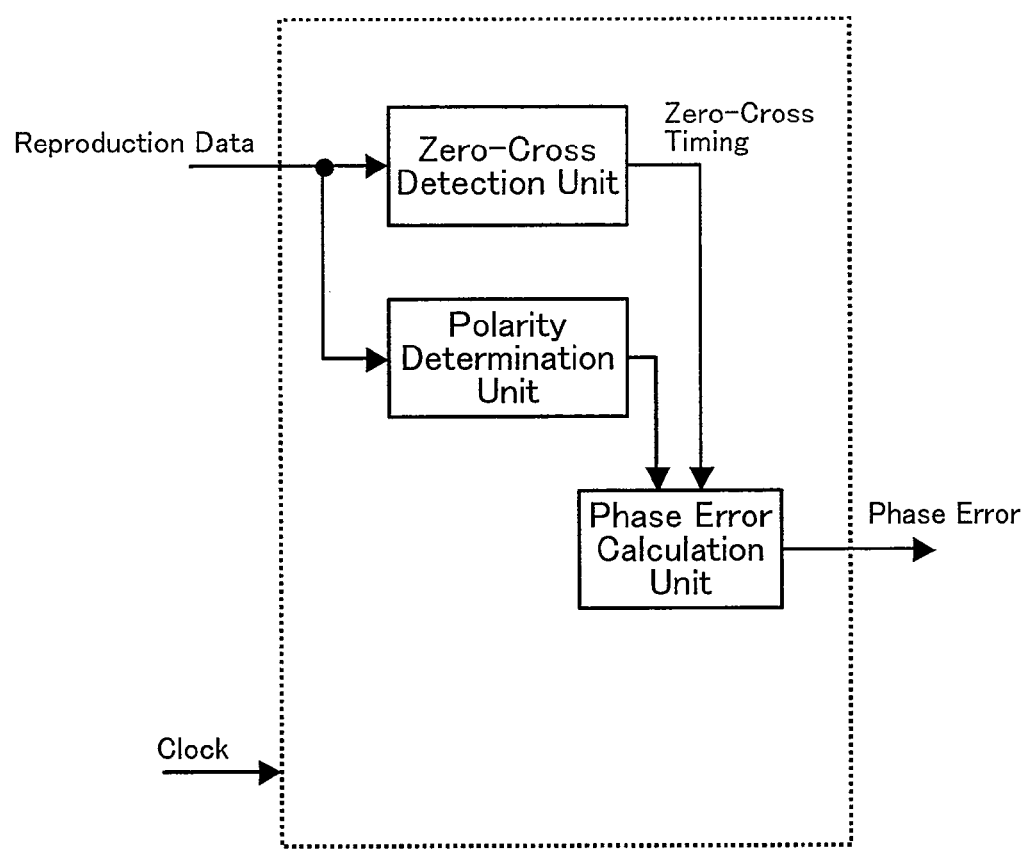
FIG. 19 is a view showing an internal structure of a phase comparator in a conventional clock generation circuit.
Figure 20:
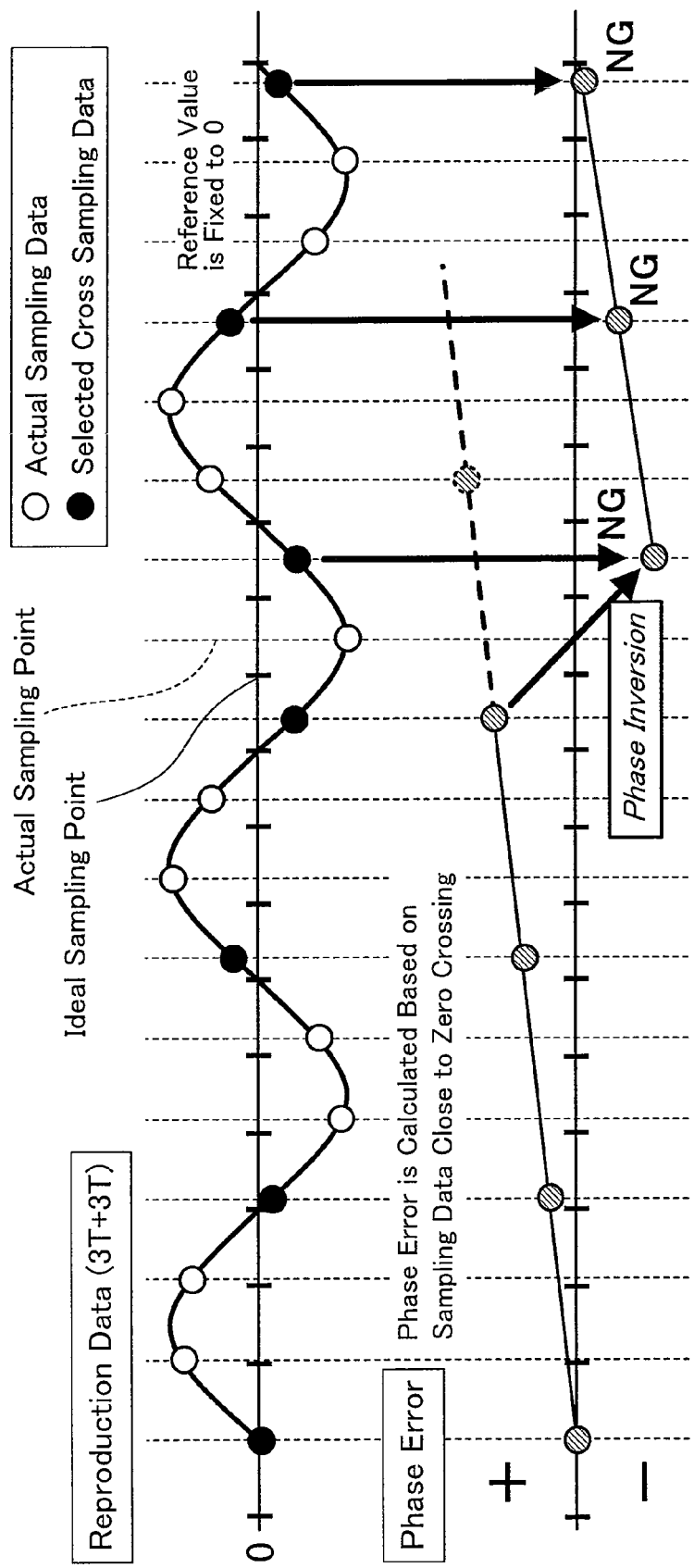
FIG. 20 is a view showing the characteristics of the phase comparator.
Figure 21:
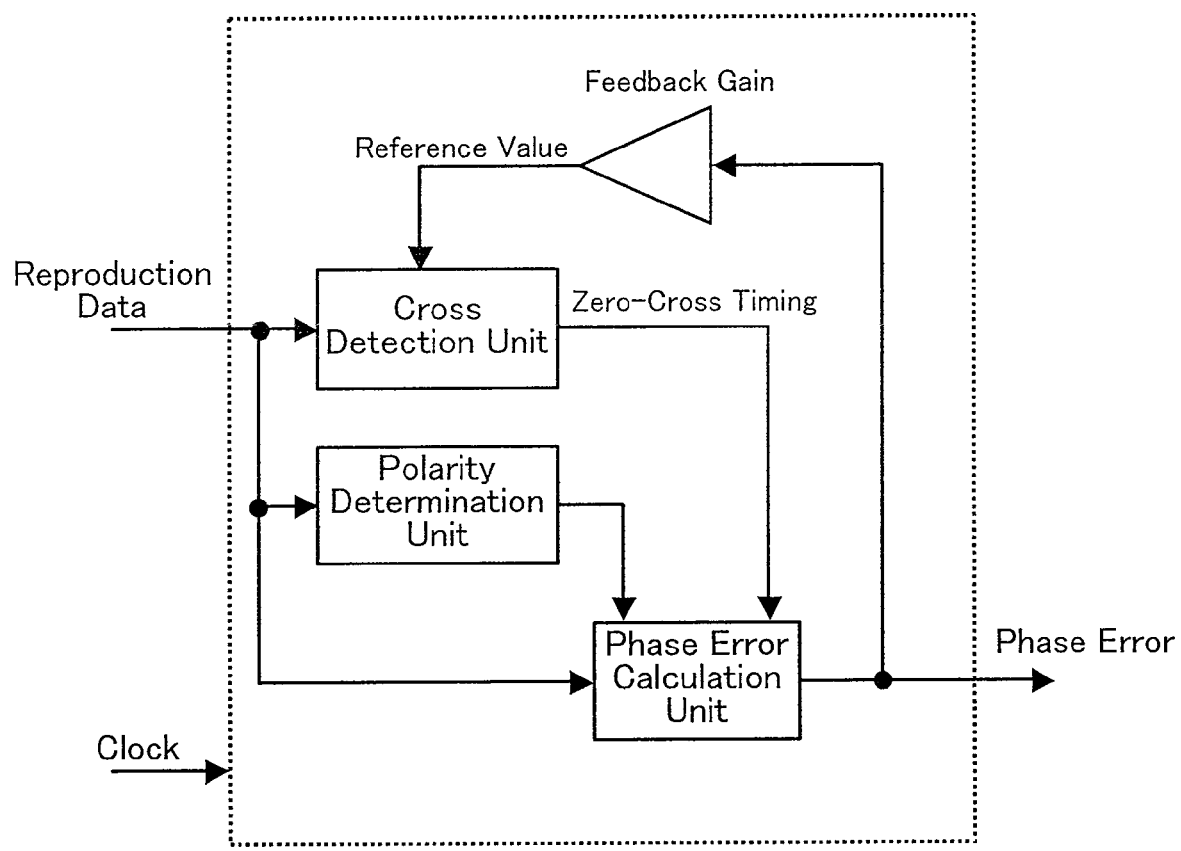
FIG. 21 is a view showing an internal structure of a phase comparator of Patent Document 2.
Figure 22:
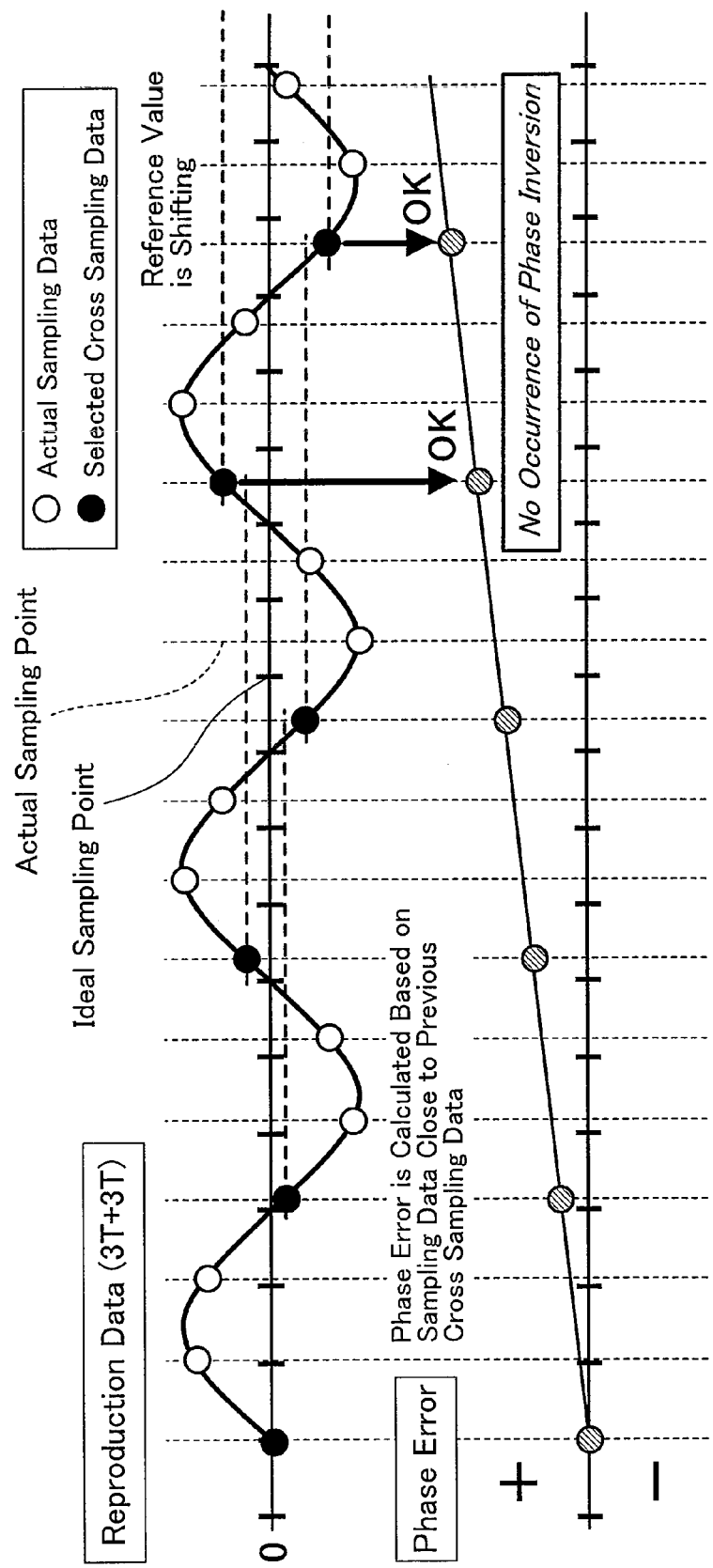
FIG. 22 is a view showing the characteristics of the phase comparator.
Figures 23A, 23B:
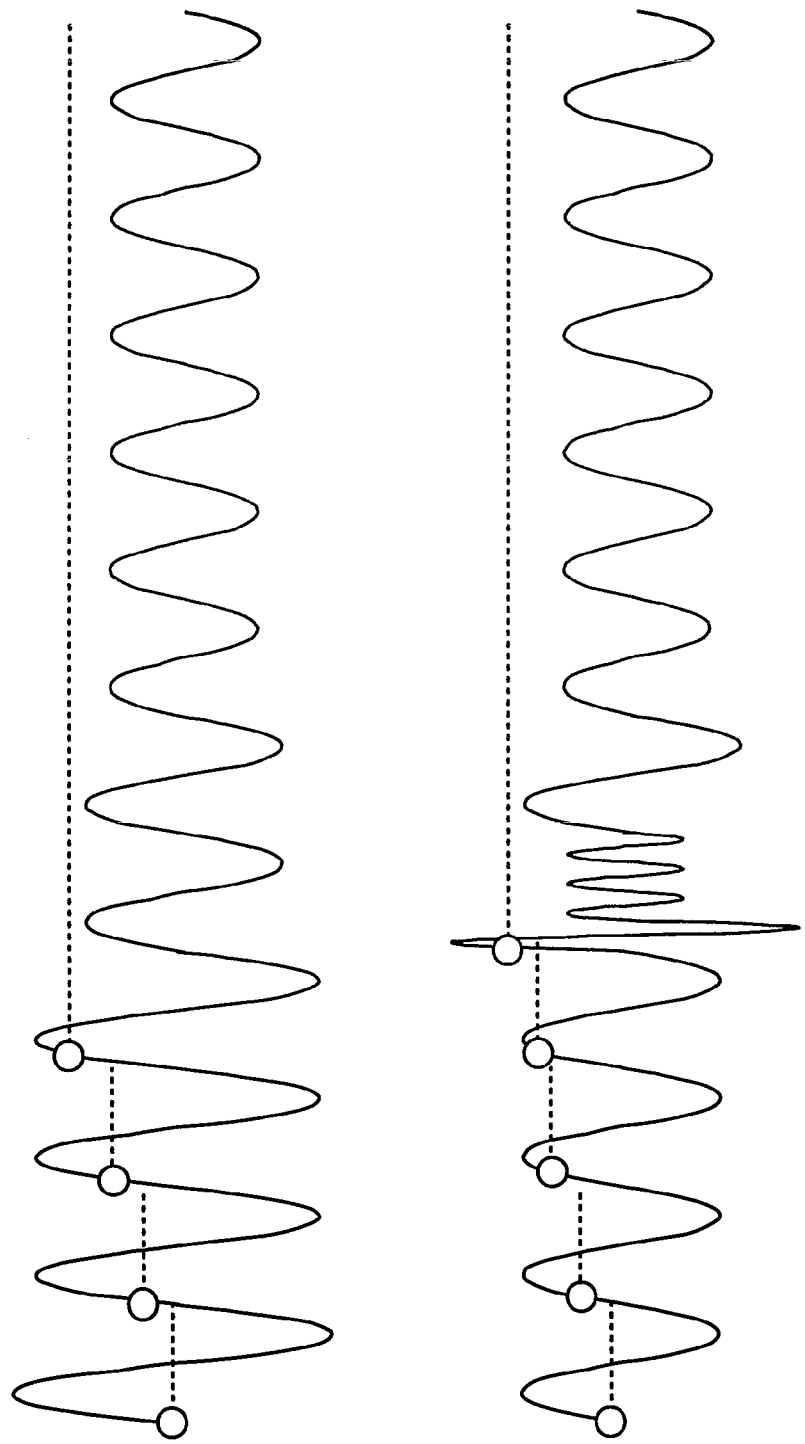
FIG. 23 is a view showing the phenomenon of the divergence of a reference value which occurs when the phase comparator is used.

FIG. 18 is a block diagram showing a schematic overall structure of a reproduction signal processor including an LSI having the embedded clock generation circuit 10 including the phase comparator 3 according to the present invention. When it is assumed that the reproduction signal processor is applied to a DVD reproduction device or the like, an information recording unit 101 is a recording medium (DVD medium), an information reading unit 102 is a pick-up which reads recorded data from the recording medium, and 103 is an LSI including a signal processing circuit which performs waveform equalization, error correction, data demodulation, and the like using the waveform of the reproduction signal read by the pick-up. The display of information or the conversion thereof to a sound is performed using decoded data and a clock which are outputted from the LSI.

Although the description has thus been given to an example of the case where the reproduction signal from a recording medium such as DVD is inputted, it will be easily appreciated that the present invention is also applicable to the case where a signal supplied through a wireless communication path, or a wired communication path such as an optical fiber, a coaxial cable, or an electric power line.

The reproduction signal processor of the present invention also encompasses the case where a control operation for setting a digital control value is performed using software.

INDUSTRIAL APPLICABILITY

As described above, the present invention allows effective use of the dynamic range of a feedbacked reference value without limiting it in a phase comparator in a clock generation circuit, and also simultaneously allows enhancement of noise immunity. Therefore, the present invention is useful in a reproduction signal processor which requires the function of reproducing a clock synchronized with data from a reproduction signal, e.g., in an optical disc reproduction system, and particularly in the case where high-density and high-double-speed reproduction is required.

The invention claimed is:

1. A phase comparator used in a clock generation circuit which extracts a synchronized clock which is synchronized with an inputted reproduction signal based on reproduction data obtained by sampling the reproduction signal with a sampling means, the phase comparator comprising:
a cross detection unit which receives the reproduction data obtained with the sampling means and a predetermined reference value, and detects a cross timing with which the reproduction data crosses the reference value;
a polarity determination unit which receives the reproduction data, and determines a polarity of an edge of the reproduction data;
a phase error calculation unit which receives the reproduction data, a cross timing signal outputted from the cross detection unit, and a determination result from the polarity determination unit, and calculates a difference between the reproduction data and a zero value at the cross timing as a phase error; and
a filtering process unit which filters the phase error calculated by the phase error calculation unit with the timing detected by the cross detection unit to generate the reference value to be given to the cross detection unit.

2. The phase comparator of claim 1, wherein the filtering process unit is a FIR filter.

3. The phase comparator of claim 1, wherein the filtering process unit is an IIR filter.

4. The phase comparator of claim 1, wherein the filtering process unit detects an envelope of the inputted phase error, and outputs the detected envelope.

5. The phase comparator of claim 1, wherein the filtering process unit determines that a signal quality of the reproduction data is low based on an interval between polarity changes in the reproduction data when the interval between the polarity changes is short, and mask-processes the corresponding phase error so as not to reflect the phase error in the filtering process unit.

6. The phase comparator of claim 1, wherein the filtering process unit has a counter for counting the timings outputted from the cross detection unit, and resets the counter and the filtering process unit every time a count value of the counter reaches a predetermined number.

7. The phase comparator of claim 1, wherein the filtering process unit has a counter for counting intervals between the timings outputted from the cross detection unit, and resets the counter and the filtering process unit every time a count value of the counter exceeds a predetermined number.

8. The phase comparator of claim 1, wherein the filtering process unit has a counter for counting a number of polarity changes in the reproduction data, and resets the counter and the filtering process unit every time a count value of the counter reaches a predetermined number.

9. The phase comparator of claim 1, wherein the filtering process unit has a first counter for counting a number of polarity changes in the reproduction data and a second counter for counting intervals between the timings outputted from the cross detection unit, and resets the first counter, the second counter, and the filtering process unit every time a difference between a value of the first counter and a value of the second counter exceeds a predetermined number.

10. The phase comparator of claim 1, wherein the cross detection unit and the filtering process unit operate independently of each other in accordance with the polarity of the edge of the sampling data relative to the reference value.

11. A clock generation circuit having the phase comparator of claim 1, which generates the synchronized clock which is synchronized with the reproduction signal based on the phase error calculated by the phase error calculation unit of the phase comparator.

12. An image display device comprising:
an LSI having the clock generation circuit of claim 11, and a signal processing circuit which decodes a reception signal including sound data and image data based on the clock obtained in the clock generation circuit; and
a display terminal which receives a decoded signal from the LSI, produces the decoded sound data, and displays the decoded image data.

13. A reproduction signal processor, wherein, in the phase comparator of claim 1, the inputted reproduction signal is supplied through a communication path including a wireless communication path, an optical fiber, a coaxial cable, or an electric power line.

14. A reproduction signal processor, wherein, in the phase comparator of claim 1, the inputted reproduction signal is supplied from an optical disc including a DVD disc, a CD disc, or a Blu-ray disc.

* * * * *